Dec. 15, 1931.  J. G. DORRANCE  1,836,793
AQUATIC VEHICLE
Filed Nov. 14, 1930  7 Sheets-Sheet 1
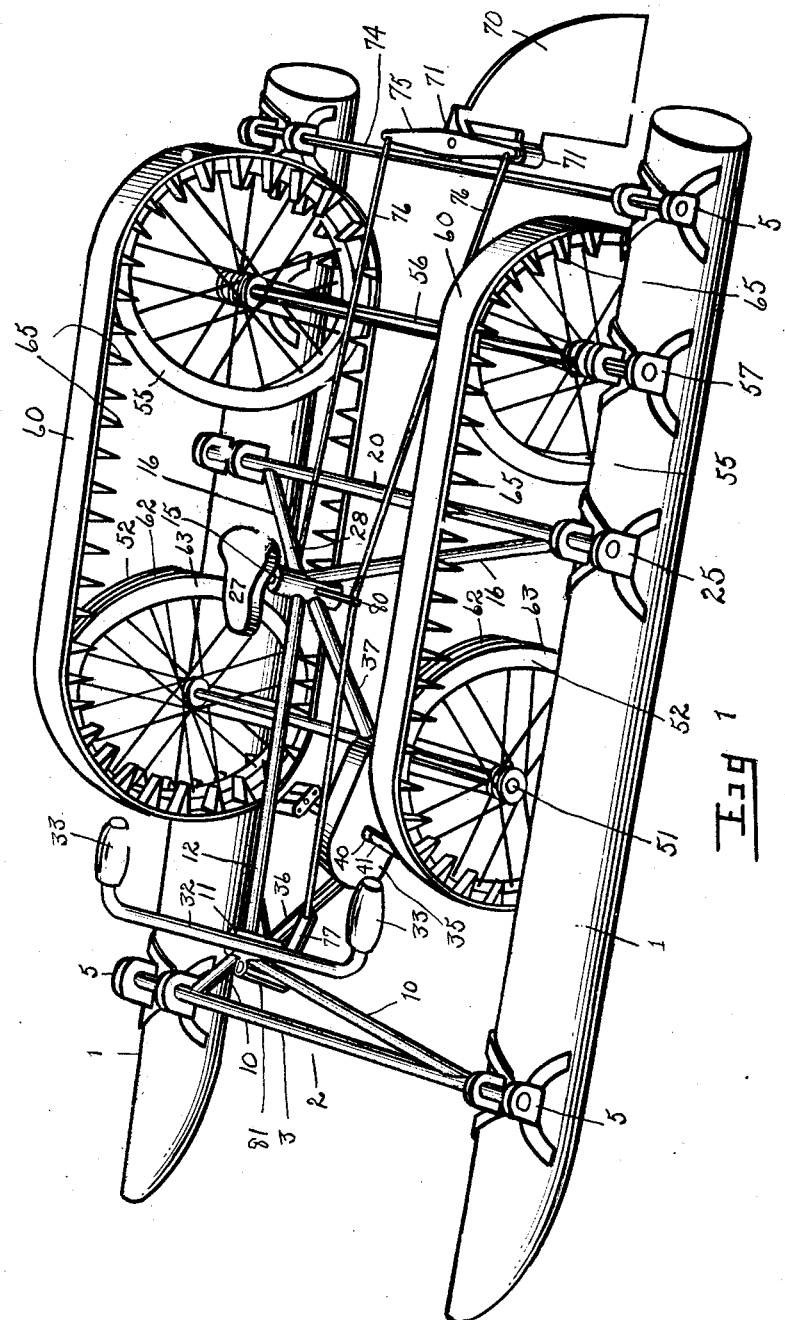
INVENTOR.
John G. Dorrance
BY Thomas L. Wilder
ATTORNEYS.

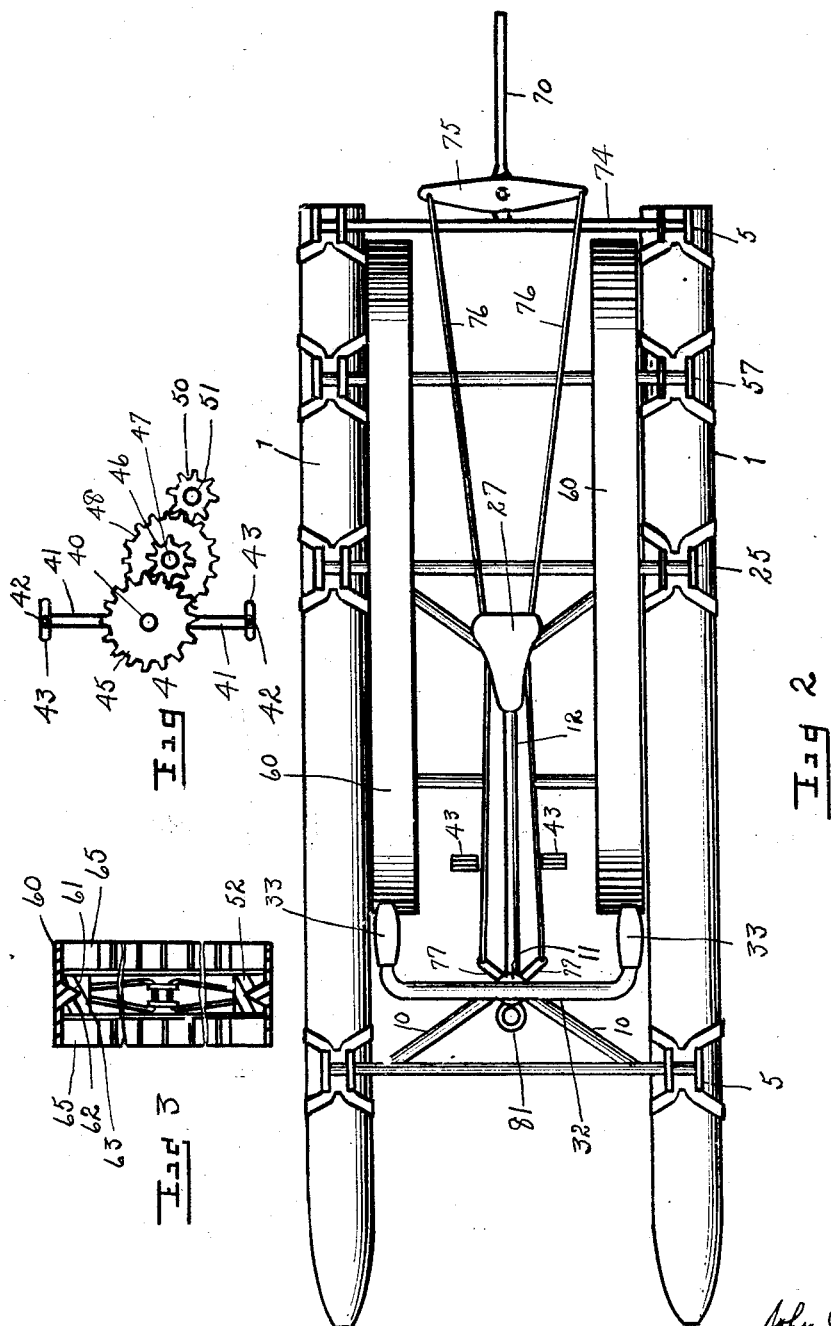

Dec. 15, 1931.　　　J. G. DORRANCE　　　1,836,793
AQUATIC VEHICLE
Filed Nov. 14, 1930　　　7 Sheets-Sheet 3
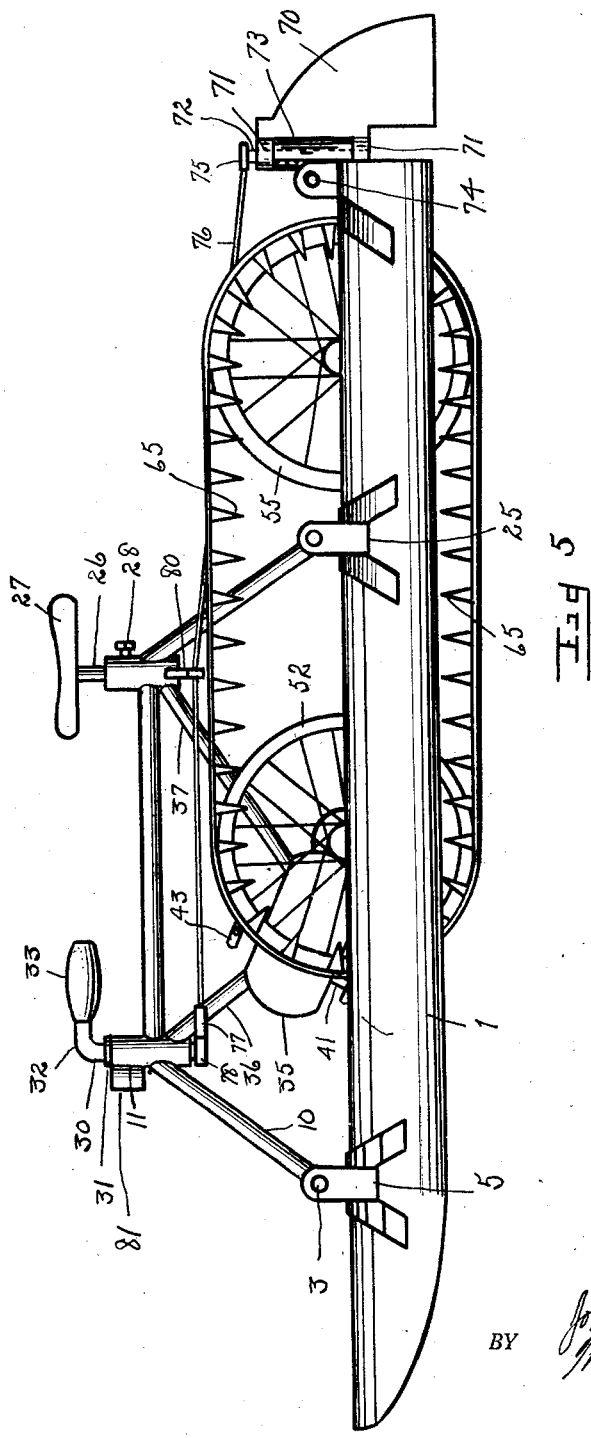
INVENTOR.
John G. Dorrance
BY Thomas L. Wilder
ATTORNEYS.

Dec. 15, 1931. J. G. DORRANCE 1,836,793
AQUATIC VEHICLE
Filed Nov. 14, 1930 7 Sheets-Sheet 4
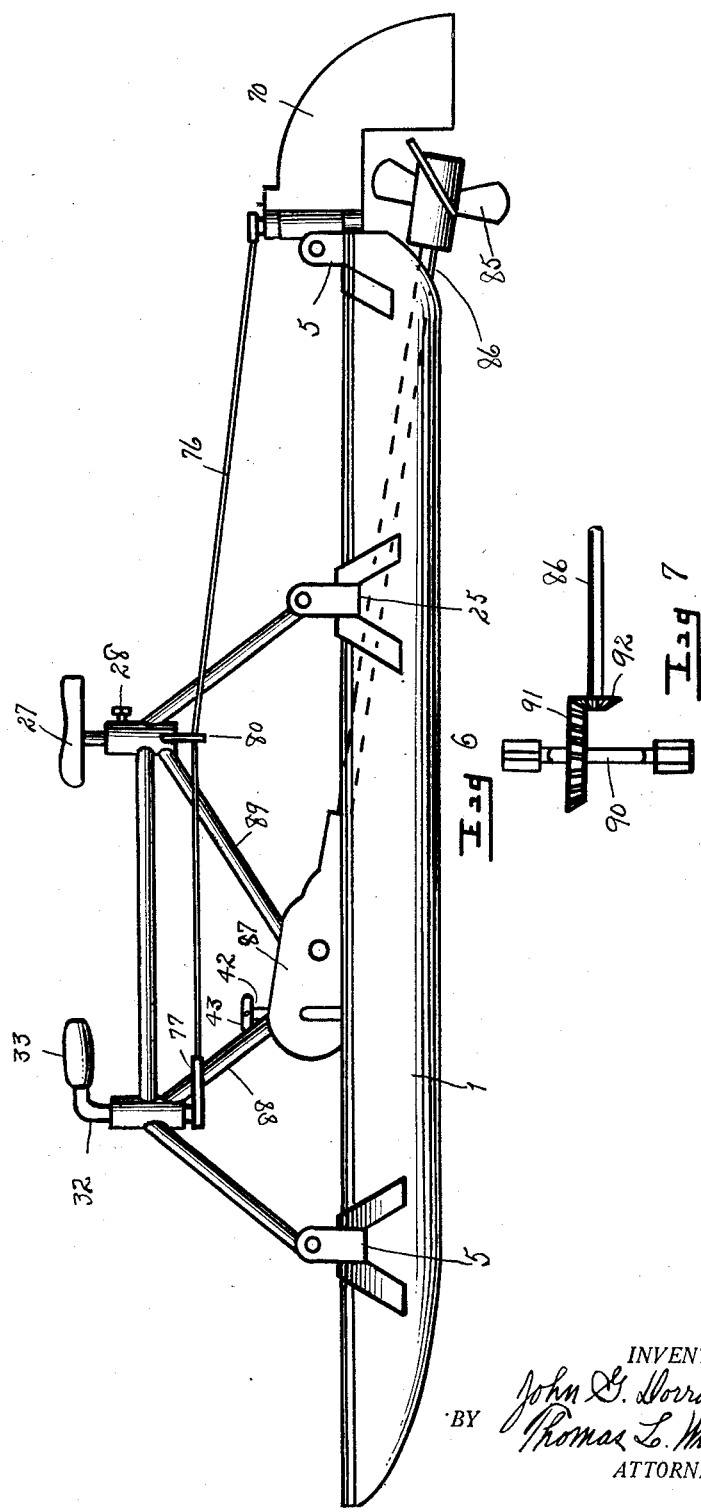
INVENTOR.
John G. Dorrance
BY Thomas L. Wilder
ATTORNEYS.

Dec. 15, 1931. J. G. DORRANCE 1,836,793
AQUATIC VEHICLE
Filed Nov. 14, 1930 7 Sheets-Sheet 5
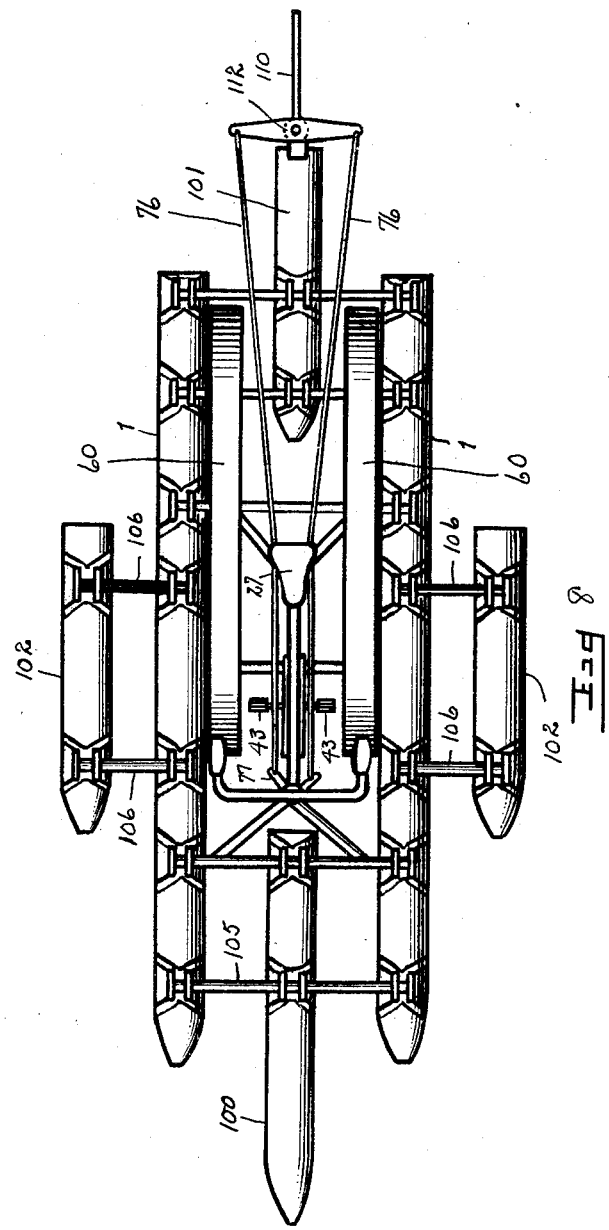
INVENTOR.
John G. Dorrance
BY Thomas L. Wilder
ATTORNEYS.

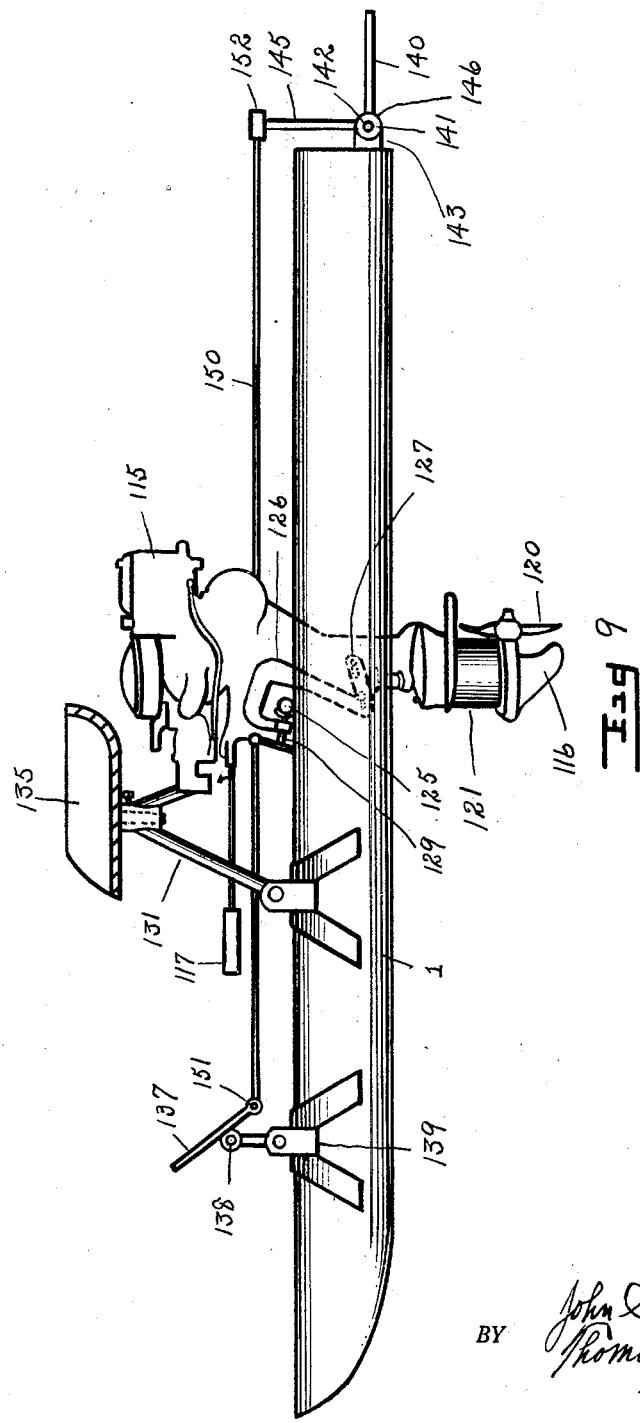

Dec. 15, 1931.       J. G. DORRANCE       1,836,793
AQUATIC VEHICLE
Filed Nov. 14, 1930        7 Sheets-Sheet 7
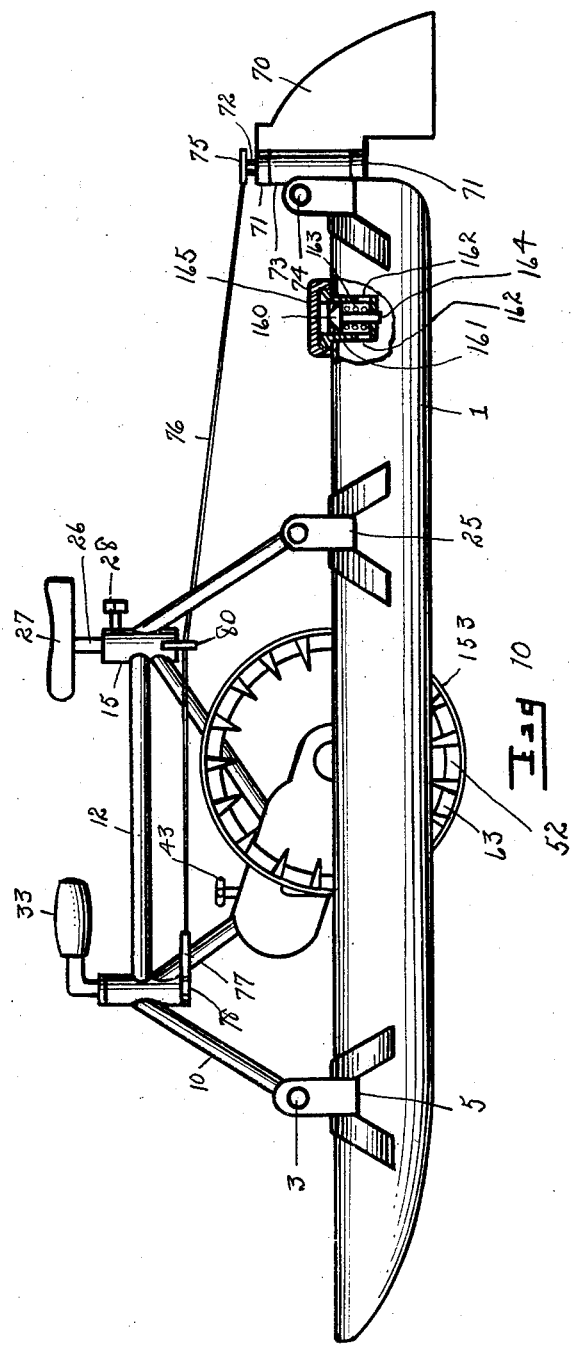
Inventor
John G. Dorrance
Thomas L. Wilder
By
Attorney Patented Dec. 15, 1931

1,836,793

UNITED STATES PATENT OFFICE

JOHN G. DORRANCE, OF PHILADELPHIA, PENNSYLVANIA

AQUATIC VEHICLE

Application filed November 14, 1930. Serial No. 495,715.

My invention relates to an aquatic vehicle and I declare the following to be a full, clear, concise and exact description thereof sufficient to enable any one skilled in the art to which it appertains to make and use the same, reference being had to the accompanying drawings in which like reference characters refer to like parts throughout.

The object of the invention is to provide a vehicle that can be propelled through the water at a comparatively rapid rate, whereby to afford pleasure and excitement to the user thereof. The vehicle will be used particularly by swimmers on the rivers, seashore and inland lakes to furnish sport and amusement for the bathers. It will provide also a racing vehicle, whereby the bathers can try their physical skill with one another. Moreover, it can be used not only as a sporting device but also by anyone desiring quick transportation by a water route.

The object will appear by reference to the drawings, in which:

Fig. 1 is a perspective view of the aquatic vehicle.

Fig. 2 is a plan view of the same.

Fig. 3 is a central transverse section of one of the tractor wheels and immediate members showing parts broken away.

Fig. 4 is a detailed view somewhat enlarged of the crank shaft and gear mechanism employed.

Fig. 5 is a side elevation of the aquatic vehicle.

Fig. 6 is a side elevation of a modified form of the aquatic vehicle.

Fig. 7 is a detailed view somewhat enlarged of the gear mechanism employed in a modified form shown in Fig. 5.

Fig. 8 is a plan view of a further modified form of the device.

Fig. 9 is a side elevation of another modified form of the device, showing one of the parts in section.

Fig. 10 is a side elevation of a still further modified form of the device, showing parts broken away.

Referring more particularly to the drawings, the vehicle embodies two water tight hollow metallic pontoons 1, 1 that may or may not be filled with compressed air considering the degree of water pressure to which the vehicle is to be subject. A frame 2 is supported upon pontoons 1, 1. Said frame comprises front horizontal bar 3 that is carried at either end in bearing brackets 5, 5; brackets 5 welded, brazed or otherwise secured to the upper surface of pontoons 1, 1; bars 10, 10 that are welded or brazed at one end to horizontal cross bar 3 and at the other end to hollow fitting 11 towards which they converge; upper horizontal bar 12 welded or brazed at one end to fitting 11 and at the other to hollow fitting or cluster 15; rear bars 16, 16 that diverge from fitting 15 and welded or brazed in each instance at one end to fitting 15 and at the rear to horizontal cross bar 20; rear horizontal cross bar 20 carried by a tight fit in bearing brackets 25, 25 which are in turn welded or brazed to the upper surface of pontoons 1, 1; and hollow fitting 15 carrying adjustable shaft 26 that supports seat 27. A set screw 28 has a threaded bearing in fitting 15, whereby to hold shaft 26 and seat 27 thereon in any given adjustable position. Front hollow fitting 11 has mounted therein shaft 30 provided with a bearing collar at 31. Handle bar 32 is formed integral or otherwise fastened to shaft 30. It is provided with grips 33, 33 for the hands of the operator.

Frame 2 carries gear and shaft casing 35. It is secured in place by bars 36, 37 which are dropped down at an angle from fittings 11 and 15 respectively and at the other end to casing 35.

Casing 35 has bearings in its opposite sides for crank and shaft 40. Crank arms 41, 41 are made integral with shaft 40 and disposed at right angles thereto in opposite directions. The extreme ends of crank arms 41, 41 are bent at right angles as at 42, 42 to form supports for pedals 43, 43. A spur gear 45 is fixed to turn with crank shaft 40 inside of casing 35. Gear 45 is in mesh with a gear pinion 46 mounted to turn idly on shaft 47 having bearings in opposite sides of casing 35. Pinion 46 is made integral with and concentric with larger gear 48. Pinion 46 is superimposed on the lateral face of gear 48, which in turn is in mesh with another pinion 50 fixed to turn with axle shaft 51. Said shaft 51 has mounted to turn therewith front traction wheels 52, 52. The ratio of gears 45, 48 and pinions 46 and 50 is designed to effect six or more turnings of axle shaft 51 to one of crank shaft 40 with which pedals 43, 43 turn. Axle shaft 51 is purposely not connected to pontoons 1, 1, whereby to allow for a small amount of play between those parts to relieve any undue strain that the motion of the water might set up therebetween. Rear traction wire wheels 55, 55 are mounted to turn upon axle 56 which is carried in brackets 57, 57, similar to brackets 5, 5. Brackets 57, 57 are welded or otherwise fastened to the upper surface of pontoons 1, 1. Wheels 52, 52 and 55, 55 are coupled together in sets of 52, 55 by the endless belts 60, 60 for propelling the vehicle through the water.

Each of the belts 60 is made of a composition rubber or other suitable material which yields sufficiently to move around wheels 52, 55. A solid V-shaped portion 61 is formed on the inside surface centrally of each of said belts 60. Said V-shaped portion 61 is adapted to fit into a corresponding V-shaped groove 62 made in the peripheral surface of the rims 63 of each of wheels 52, 55. The V-shaped portion 61 on each of the belts 60 together with the adjacent inner surface of each of belts 60 will allow for sufficient friction, whereby to cause belts 60, 60 to travel on their respective sets of tractor wheels 52, 55. Moreover, each of the belts 60 has formed on its inner surface inwardly projecting paddles 65. Paddles 65 are spaced longitudinally at suitable intervals. They are formed integral with belt 60 and adapted to stand out therefrom in an unyielding manner, whereby to perform their function as paddles. Said paddles are formed in pairs leaving a space therebetween to clear the rims 63 of tractor wheels 52, 55. Furthermore, each of the paddles 65 is wedge shape with the edge outermost to facilitate their movement into and out of the water as they travel with belts 60, 60. It will be observed that the means of propulsion utilizes the advantages of the land tractor and in this respect is preferable to the ordinary side wheel with its limited number of paddles in comparison heretofore used.

The means for steering the vehicle embodies a rudder 70 that has forwardly extending bearing members 71, 71 for the reception of shaft 72 which is projected therethrough with a tight fit, whereby to turn therewith. Shaft 72, however, has a loose fit in sleeve 73 made integral with rod 74. Sleeve 73 is disposed at right angles to said rod 74. A yoke 75 is fixed to turn with shaft 72. Cables 76—76 connect the free ends of yoke 75 with arms 77, 77 formed integral with a ring 78 having a tight fit on lower end of shaft 30. Arms 77, 77 are disposed at right angles to shaft 30, whereby to extend in a horizontal plane and are at an angle to each other, whereby the turning of handle bar 32 will effect a corresponding pull on either one of the cables 76—76 to turn the rudder in the desired direction to steer the vehicle. Guide members 80, 80 extend in opposite directions from cluster fitting 15 and have apertures formed therein for the passage of cables 76—76.

The operation of the vehicle is effected by the operator seating himself on seat 27 and working pedals 43 with his feet. The revolving of pedals 43 will cause a turning of crank shaft 40 and the train of gears and pinions 45, 48, 46 and 50 to turn axle shaft 51 and wheels 52, 52. The rotation of wheels 52, 52 will cause endless belts 60, 60 to travel, whereby to propel the vehicle through the water in any desired direction determined by the movement of handle bar 32. Although the perimeter of wheels 52, 55 in each set is disposed below the lower surface of pontoons 1, 1 the wheels are submerged less than half their diameters, whereby to effect the maximum efficiency of paddles 65.

A socket 81 is formed integral with fitting 11 to allow for the disposition of a mast to support a sail, not shown. Figures 6 and 7 show a modification of the device. Here a propeller screw 85 is employed instead of the tractor wheels 52, 55 of the former structure. Propeller screw 85 is fixed to revolve with shaft 86 that has a bearing in casing 87. Casing 87 corresponds to casing 35 of the former structure and is supported by tubes 88 and 89 in like manner. The crank shaft 90, however, has mounted to turn therewith a bevel gear 91. Bevel gear 91 is larger in diameter than bevel gear 92, whereby to increase the ratio of turnings of shaft 86 over crank shaft 90.

Fig. 8 shows a still further modification embodying additional pontoons 100 and 101 and 102. 102. Pontoons 100, 101 and 102 are shorter in length than pontoons 1. Pontoon 100 is disposed in advance of pontoons 1 and pontoon 101 is disposed in the rear. Moreover pontoons 102 are disposed on either side of pontoons 1. Said pontoons 100, 101 and 102 are connected to pontoons 1 by rods 105 and 106 respectively. Rudder 110 is mounted as heretofore described from a bracket fixed to the rear upper end of pontoon 101 and having a sleeve 112.

Fig. 9 shows a still further modified form of the device. In this construction there is employed an outboard or removable motor 115 which is of well known construction having a steering rudder 116 and a handle 117 for actuating the rudder 116. The propeller wheel 120 is revolved by a gas fed motor 121. The removable motor is located about midway of the pontoons 1, 1, whereby to properly balance the device. It is attached to a cross bar 125 mounted at either end to pontoons 1, 1. To this end arms 126, 126 are employed, and pivoted at 127, 127 to motor 115. The opposite ends are equipped with clamping bolts 129, 129 that are adapted to engage cross bar 125 to hold motor 115 thereto. By thus pivotally mounting motor 115 its lower end can swing or yield should it come in contact with any obstruction. A seat 135 is supported by a frame 131 on pontoons 1, 1 conveniently near motor 115, whereby the operator can manipulate steering handle 117 of motor 115 to turn rudder 116 to guide the craft. Foot rests 137 are pivotally mounted on U-shaped rod 138 which is carried in brackets 139, 139 mounted on pontoons 1, 1 for the convenience and comfort of the person occupying seat 135 and to control horizontal rudder 140. Horizontally disposed rudder 140 is pivotally mounted at 141 to rod 142 carried in brackets 143, 143 welded or otherwise secured to the ends of pontoons 1, 1. Upstanding bars 145, 145 are attached to sleeve 146 of rudder 140. Bars 145, 145 are connected by rods 150, 150 to foot pedals 137. For this purpose, rods 150, 150 are pivoted at 151, 151 to pedals 137 at one end and at the other, secured to collars 152, 152 which are fastened with a tight fit to upstanding bars 145, 145. The seat of the operator is located also about midway of the pontoons 1, 1 and in a convenient location to the motor 115.

Fig. 10 shows a structure substantially similar to that illustrated in Figs. 1 to 5 inclusive. Here, however, only one set of tractor wheels as 52, 52 is employed. The belts 153, 153 are reduced accordingly to fit around the periphery of wheels 52.

The structures illustrated in Fig. 1 to 5 inclusive and 10 can travel on the land as well as water. A one way spring pressed valve 160 is mounted in each of pontoons 1, 1, whereby to allow for filling said pontoons 1, 1 with a gas pressure. Said valve 160 has a casing 161 that is welded or otherwise secured to the casing of pontoons 1, 1 in each instance. Casing 161 has openings at 162, 162 for the passage of gas under pressure to the interior of the pontoons 1, 1. Valve 160 is urged normally upward against its seat by coil spring 163. The lower surface of casing 161 is provided with an aperture for the projection of valve stem 164 which slides therein. A cap 165 is screw-threaded to the upper enlarged portion of valve casing 161.

Having thus described my invention what I claim as new and desire to secure by Letters Patent is as follows:

1. In an aquatic vehicle, pontoons for floating the device, a frame having a seat supported upon said pontoons, tractor belts having inwardly projecting paddles intermediately connected with said pontoons, whereby to propel the vehicle and a rudder for steering said vehicle.

2. In an aquatic vehicle, pontoons for floating said device, a frame mounted upon said pontoons, said frame having a seat, a steering apparatus and gear mechanism, tractor wheels turned by said gear mechanism and belts having inwardly extending paddles mounted upon said tractor wheels, whereby to propel said vehicle.

3. In an aquatic vehicle, pontoons for floating said device, a frame having a seat and handle bars supported upon said pontoons, tractor belts having inwardly extending paddles intermediately connected with said pontoons, belts mounted upon said tractor wheels and gears actuated by pedals mounted upon said frame, whereby the movement of said pedals will actuate said tractor to propel the vehicle.

4. In an aquatic vehicle, pontoons for floating the device, a seat intermediately connected with said pontoons, handle bars intermediately connected with said pontoons, whereby to steer said device, tractor belts having inwardly extending paddles mounted relative to said pontoons and means for rotating said tractor wheels to propel said vehicle.

5. In an aquatic vehicle, means for floating said device, a frame having a seat and handle bars supported upon said first named means, tractor belts having inwardly extending paddles intermediately connected with said first named means for supporting belts with pedals, gear means for turning said tractor wheels to actuate the belts to move the vehicle, and means connected with said handle bars whereby to steer said vehicle.

6. In an aquatic vehicle, pontoons for floating the device, tractor belts having inwardly projecting paddles intermediately connected with said pontoons, whereby to propel the vehicle and means for steering said vehicle.

In testimony whereof I have affixed my signature.

JOHN G. DORRANCE.